(12) United States Patent
Sasaki

(10) Patent No.: US 10,235,768 B2
(45) Date of Patent: Mar. 19, 2019

(54) IMAGE PROCESSING DEVICE, IN-VEHICLE DISPLAY SYSTEM, DISPLAY DEVICE, IMAGE PROCESSING METHOD, AND COMPUTER READABLE MEDIUM

(71) Applicant: Mitsubishi Electric Corporation, Tokyo (JP)

(72) Inventor: Ryosuke Sasaki, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/514,187

(22) PCT Filed: Dec. 10, 2014

(86) PCT No.: PCT/JP2014/082679
§ 371 (c)(1),
(2) Date: Mar. 24, 2017

(87) PCT Pub. No.: WO2016/092650
PCT Pub. Date: Jun. 16, 2016

(65) Prior Publication Data
US 2017/0301107 A1    Oct. 19, 2017

(51) Int. Cl.
*G06K 9/00* (2006.01)
*G06T 7/70* (2017.01)
(Continued)

(52) U.S. Cl.
CPC .............. *G06T 7/70* (2017.01); *B60R 1/00* (2013.01); *B60R 11/0229* (2013.01); *G06K 9/00335* (2013.01); *G06K 9/00805* (2013.01); *G06K 9/4604* (2013.01); *G06K 9/6218* (2013.01); *G06K 9/6267* (2013.01); *G08G 1/166* (2013.01); *G08G 1/167* (2013.01); *B60R 2300/307* (2013.01)

(58) Field of Classification Search
None
See application file for complete search history.

(56) References Cited

U.S. PATENT DOCUMENTS 8,085,140 B2    12/2011    Mochizuki et al.
2009/0303078 A1    12/2009    Mochizuki et al.

FOREIGN PATENT DOCUMENTS

JP    2000-003499 A    1/2000
JP    2007-172541 A    7/2007
(Continued)

OTHER PUBLICATIONS

International Search Report for PCT/JP2014/082679, dated Feb. 24, 2015.

*Primary Examiner* — Stephen P Coleman
(74) *Attorney, Agent, or Firm* — Sughrue Mion, PLLC; Richard C. Turner

(57) ABSTRACT

In an image processing device (120), an extraction unit (121) extracts a plurality of objects from a captured image (101). A prediction unit (122) predicts a future distance between the plurality of objects extracted by the extraction unit (121). A classification unit (123) classifies into groups the plurality of objects extracted by the extraction unit (121) based on the future distance predicted by the prediction unit (122). A processing unit (124) processes the captured image (101) into a highlight image (102). The highlight image (102) is an image in which the plurality of objects classified by the classification unit (123) are highlighted separately for each group.

18 Claims, 7 Drawing Sheets

(51) Int. Cl.
    *G08G 1/16* (2006.01)
    *B60R 1/00* (2006.01)
    *B60R 11/02* (2006.01)
    *G06K 9/46* (2006.01)
    *G06K 9/62* (2006.01)

(56) References Cited

FOREIGN PATENT DOCUMENTS

| | | |
|---|---|---|
| JP | 2009-040107 A | 2/2009 |
| JP | 2010-120617 A | 6/2010 |
| JP | 2011-150475 A | 8/2011 |
| JP | 2012-153256 A | 8/2012 |
| JP | 2012-169826 A | 9/2012 |
| JP | 2012-218505 A | 11/2012 |
| JP | 2012-226437 A | 11/2012 |
| JP | 5171629 B2 | 3/2013 |
| JP | 2013-216315 A | 10/2013 |
| JP | 2014-002477 A | 1/2014 |
| WO | 2008/029802 A1 | 3/2008 |

| TIME | FEATURE QUANTITY | CATEGORY | RELATIVE LOCATION | VELOCITY | ... |
|---|---|---|---|---|---|
| 2013/10/01 12:00:00 | ... | MAN | ... | ... | ... |
| 2013/10/01 12:00:00 | ... | AUTOMOBILE | ... | ... | ... |
| ... | ... | ... | ... | ... | ... |

| FIRST OBJECT | SECOND OBJECT | CONDITION | RELATIONSHIP |
|---|---|---|---|
| MAN | MAN | C1: $Df > Ta$ | NOT EXIST |
| MAN | AUTOMOBILE | C2: $Df < Ta$ AND $|Vc2| = 0$ | EXIST |
| MAN | BICYCLE | C3: $Df < Ta$ AND $|Vc2| = 0$ | EXIST |
| BICYCLE | BICYCLE | C4: $|Dc - Df| < Tb$ AND $|Vc1| > 0$ AND $|Vc2| > 0$ AND $|Vc1 - Vc2| < Tc$ | EXIST |
| AUTOMOBILE | AUTOMOBILE | C5: TRUE | NOT EXIST |
| ... | ... | ... | ... |

| FIRST OBJECT | SECOND OBJECT | CONDITION | RELATION-SHIP | TO-BE-EMPHA-SIZED-AFTER-CANCELLATION OBJECT |
|---|---|---|---|---|
| MAN | MAN | C1: Df>Ta | NOT EXIST | ... |
| MAN | AUTO-MOBILE | C2: Df<Ta AND \|Vc2\|=0 | EXIST | - |
| | | C6: MAN GETS OUT OF DRIVER'S SEAT OF AUTOMOBILE | NOT EXIST | FIRST OBJECT |
| | | C7: MAN GETS OUT OF REAR SEAT OF AUTOMOBILE | NOT EXIST | SECOND OBJECT |
| ... | ... | ... | ... | ... |
| MAN | ANIMAL | C8: Df<Ta | EXIST | - |
| | | C9: Ma>Te | NOT EXIST | SECOND OBJECT |
| ... | ... | ... | ... | ... |

IMAGE PROCESSING DEVICE, IN-VEHICLE DISPLAY SYSTEM, DISPLAY DEVICE, IMAGE PROCESSING METHOD, AND COMPUTER READABLE MEDIUM

This is a National Stage of International Application No. PCT/JP2014/082679 filed Dec. 10, 2014, the contents of all of which are incorporated herein by reference in their entirety.

TECHNICAL FIELD

The present invention relates to an image processing device, an in-vehicle display system, a display device, an image processing method, and an image processing program.

BACKGROUND ART

Conventionally, there is a running information providing device providing a visual recognition state of a driver as running information to support driving (for instance, refer to Patent Literature 1). The running information providing device classifies into some groups objects around a vehicle according to an attribute of each object, and displays each group with a different color. The objects include other vehicles, pedestrians, signs, traffic lights, pedestrian crossings, and the like. "Attributes" of an object are, for instance, a category and a distance of the object.

CITATION LIST

Patent Literature

Patent Literature 1: WO2008/029802A1

SUMMARY OF INVENTION

Technical Problem

The conventional running information providing device classifies, among the objects around the vehicle, objects of which the category is the same and a present distance between each other is not more than a threshold value into the same group. Upon grouping the objects, a future distance between the objects is not considered.

For instance, it is assumed that, among four pedestrians who are standing closely with each other, one pedestrian is in a posture to start running. In this case, although a present distance between the pedestrian who is about to run and the remaining three pedestrians is small, a future distance is considered to become large.

However, the conventional running information providing device displays the four pedestrians as the same group. Therefore, it is hard for the driver to visually recognize the pedestrian who is about to run and the remaining three pedestrians separately. As a result, when the pedestrian actually starts running, since the driver is late to notice the pedestrian, the safe driving may be degraded.

As discussed above, there may be a case in which even if the present distance between the objects is not more than the threshold value, depending on the future distance between the objects, the objects should be visually recognized separately. However, the conventional art has a problem that a grouping suitable for such a case cannot be carried out.

The present invention aims, for instance, to appropriately classify, with respect to the objects which are to be highlighted separately for each group, the objects which should be visually recognized separately and the objects which should be visually recognized together.

Solution to Problem

An image processing device according to one aspect of the present invention includes:
an extraction unit to extract a plurality of objects including at least one moving object from a captured image in which the plurality of objects are photographed;
a prediction unit to predict a future distance between the plurality of objects extracted by the extraction unit;
a classification unit to classify into groups the plurality of objects extracted by the extraction unit based on the future distance predicted by the prediction unit; and
a processing unit to process the captured image into a highlight image in which the plurality of objects classified by the classification unit are highlighted separately for each group.

Advantageous Effects of Invention

In the present invention, objects are classified into groups regardless of the present distance between the objects and based on the future distance between the objects. Therefore, according to the present invention, it is possible to appropriately classify, with respect to the objects which are to be highlighted separately for each group, the objects which should be visually recognized separately and the objects which should be visually recognized together.

DESCRIPTION OF EMBODIMENTS

Figure 1:
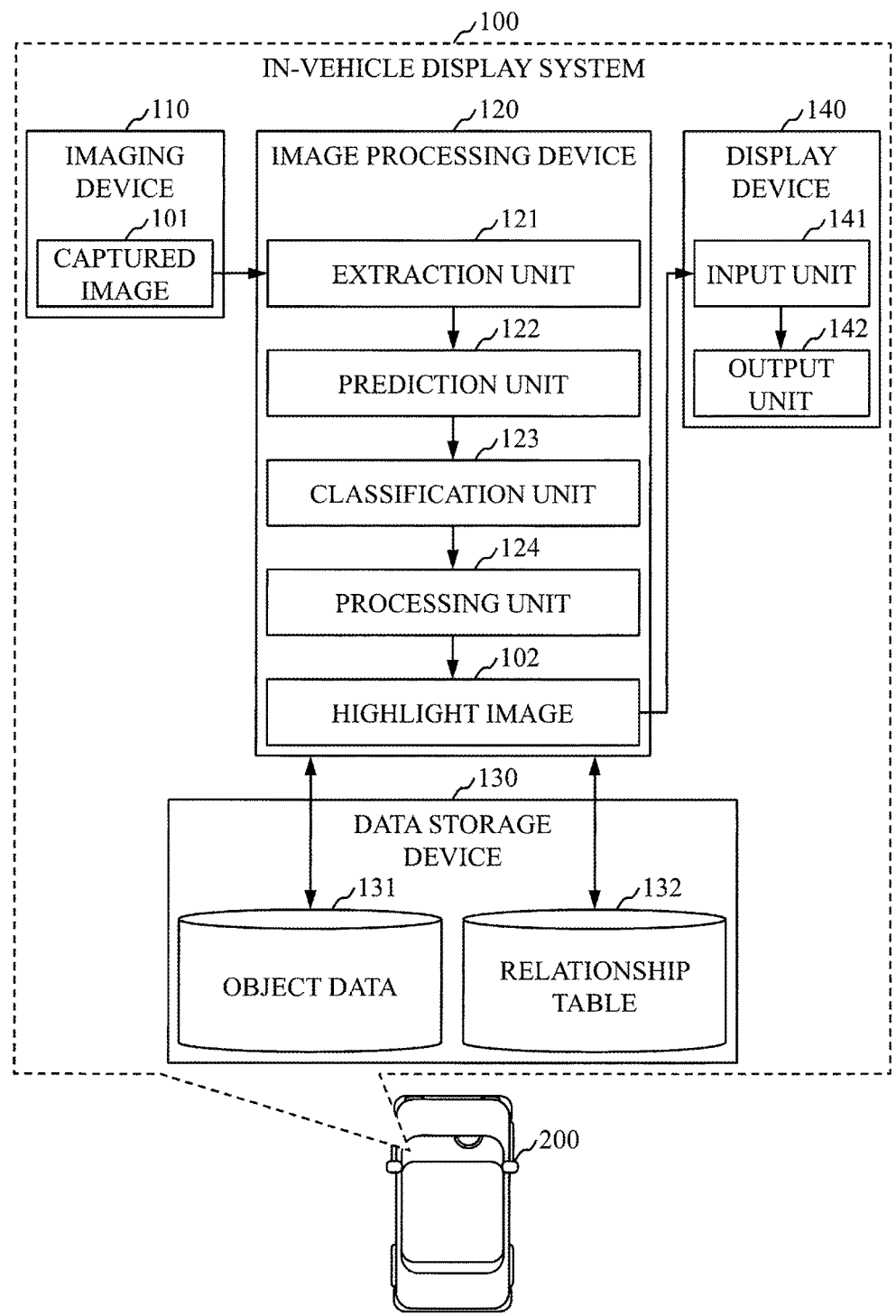
FIG. 1 is a block diagram illustrating a configuration of an in-vehicle display system according to a first embodiment.

Hereinafter, embodiments of the present invention will be explained with reference to the drawings. Note that, in each drawing, the same sign is assigned to the same or corresponding part. In the explanation of embodiments, for the same or corresponding parts, the explanation will be omitted or simplified appropriately.

First Embodiment

At first, an outline of the present embodiment will be explained.

In the present embodiment, objects to be photographed are classified into some groups regardless of a present distance between the objects and based on a future distance between the objects, and highlighted separately for each group. That is, upon grouping the objects, the future distance between the objects is considered. "Highlight" means to make an object easily visually recognizable in an image by surrounding with a frame or coloring the object captured in the image. The objects include moving objects such as vehicles, men, animals, and the like, and unmoving objects such as signs, traffic lights, pedestrian crossings, and the like. The vehicles includes automobiles, motorcycles, bicycles, and the like. Each object has an attribute. "Attributes" are, for instance, a category, a distance, and a velocity of an object. "Category", which is a type of the attribute, means, regardless of the current status of the object, a property or a species by which the object can be classified. For instance, even if the object is not moving at present, if the object has an ability to move, the category of the object is a moving object. The category can be considered to have layers. For instance, as a lower layer of the moving object, there are categories of a lower level such as a vehicle, a man, and an animal. As a lower layer of the vehicle, there are categories of a further lower level such as an automobile, a motorcycle, a bicycle, and the like. "Distance", which is a type of the attribute, does not mean "the present distance between the objects" and "the future distance between the objects" that have been discussed above, but means a distance between a position at which the object is photographed and the object.

For instance, it is assumed that, among four men who are standing closely with each other, one man is in a posture to start running. In this case, although the present distance between the man who is about to run and the remaining three men is small, it is considered that the future distance will be large. If the four men are highlighted together as the same group, it is hard to visually recognize the man who is about to run and the remaining three men separately. In the present embodiment, the future distance between the four men is considered, and thereby the man who is about to run and the remaining three men are classified into different groups. Then, an image in which the four men are photographed is processed into an image in which the one man is highlighted as one group and the remaining three men are highlighted together as another group. Therefore, for a person who looks at the processed image, it is easy to visually recognize the man who is about to run and the remaining three men separately.

In the present embodiment, upon grouping the objects, relationship between the objects is also considered.

For instance, it is assumed that, away from one parked vehicle, one man is approaching the vehicle. In this case, although the present distance between the parked vehicle and the man approaching the vehicle is large, the future distance is considered to become 0. Further, between the parked vehicle and the man approaching the vehicle, it is considered that there is relationship of a vehicle and a man getting in the vehicle. If the one vehicle and the one man are highlighted separately as different groups, it is hard to visually recognize the parked vehicle and the man approaching the vehicle together. However, in such a case, it is more effective to visually recognize the both together. In the present embodiment, the relationship between the one vehicle and the one man is considered, and thereby the parked vehicle and the man approaching the vehicle are classified into the same group. Then, the image in which the one vehicle and the one man are photographed is processed into an image in which the one vehicle and the one man are highlighted together as one group. Therefore, for a person who looks at the processed image, it is easy to visually recognize the parked vehicle and the man approaching the vehicle together.

For instance, the present embodiment can be applied to a support for driving. In the present embodiment, as a result of the movement prediction of objects around a vehicle, or a result of the estimation of the relationship between the objects, it is possible to perform display with high visual recognizability with respect to the surrounding status of the vehicle. Accordingly, the safety confirmation of the driver is supported.

Next, as a detail of the present embodiment, a configuration of a system according to the present embodiment, an operation of the system according to the present embodiment, and an effect of the present embodiment will be explained in order.

\*\*\*Explanation of Configuration\*\*\*

FIG. 1 is a block diagram illustrating a configuration of an in-vehicle display system 100 according to the present embodiment.

As illustrated in FIG. 1, the in-vehicle display system 100 includes an imaging device 110, an image processing device 120, a data storage device 130, and a display device 140.

The imaging device 110 is, for instance, a stereo camera or a radar. The imaging device 110 is mounted on a vehicle 200. The imaging device 110 photographs surroundings of the vehicle 200 to acquire a captured image 101. The captured image 101 is an image in which a plurality of objects including at least one moving object are photographed.

The image processing device 120 is, for instance, a computer. The image processing device 120 may be mounted on the vehicle 200, brought by the driver to the vehicle 200, or installed outside the vehicle 200. The image processing device 120 includes an extraction unit 121, a prediction unit 122, a classification unit 123, and a processing unit 124.

The extraction unit 121 acquires the captured image 101 from the imaging device 110. The extraction unit 121 extracts the plurality of objects from the acquired captured image 101. As discussed above, the plurality of objects include at least one moving object.

The extraction unit 121 carries out the following three processes on the extracted plurality of objects.

As for the first process, the extraction unit 121 calculates a present distance Dc between the extracted plurality of objects. "Present" specifically means a time point on which the captured image 101 is photographed by the imaging device 110. "Present distance between a plurality of objects" means, when there are two objects, the present distance between one of the two objects and the other; when there are three or more objects, the present distance between each one of the three or more objects and the other objects.

As for the second process, the extraction unit 121 determines a category of each of the extracted plurality of objects. For instance, the extraction unit 121 determines whether the category of an object is a moving object or a non-moving object. In the present embodiment, the extraction unit 121 determines, for the moving object, whether the category of the object is a vehicle, a man, or an animal. In addition, the extraction unit 121 determines, for the vehicle, whether the category of the object is an automobile, a motorcycle, or a bicycle.

As for the third process, the extraction unit 121 estimates a current velocity Vc of an object of which the category is determined to be a moving object. For instance, the extraction unit 121 estimates the current velocity Vc of an object of which the category is determined to be a vehicle or a man.

The prediction unit 122 predicts a future distance Df between the plurality of objects extracted by the extraction unit 121. "Future" specifically means a time point which is a few seconds, a few tens of seconds, or a few minutes after the present. "Future distance between a plurality of objects" means, when there are two objects, a future distance between one of the two objects and the other; when there are three or more objects, a future distance between each of the three or more objects and the other objects. For instance, the prediction unit 122 predicts, from the past behavior of an object of which the category is determined to be a moving object by the extraction unit 121, the movement of the object, and calculates, based on the result of the movement prediction, a distance between the object after the movement and another object as the future distance Df. "Past behavior" means data of information collected for each time of day after the object is extracted for the first time by the extraction unit 121, the information being acquired by the extraction unit 121, and corresponds to object data 131 which will be discussed later.

As for one kind of the movement prediction process, the prediction unit 122 judges whether or not a posture of an object of which the category is determined to be a man by the extraction unit 121 is a posture to start running. The prediction unit 122 predicts, based on the judgement result, the future distance Df between the object of which the category is determined to be a man by the extraction unit 121 and another object extracted by the extraction unit 121.

The classification unit 123 classifies into groups, based on the future distance Df predicted by the prediction unit 122, the plurality of objects extracted by the extraction unit 121. That is, the classification unit 123 classifies, among the plurality of objects extracted by the extraction unit 121, objects of which the future distance Df between each other predicted by the prediction unit 122 is larger than a threshold value Ta, into different groups. The classification unit 123 classifies, among the plurality of objects extracted by the extraction unit 121, objects of which the future distance Df between each other predicted by the prediction unit 122 is smaller than the threshold value Ta, into the same group. The classification unit 123 may classify, among the plurality of objects extracted by the extraction unit 121, objects of which the future distance Df between each other predicted by the prediction unit 122 is the same as the threshold value Ta, into the same group or into different groups.

In the present embodiment, the classification unit 123 further estimates, based on the future distance Df predicted by the prediction unit 122 and the category determined by the extraction unit 121, relationship between the plurality of objects extracted by the extraction unit 121. The classification unit 123 classifies the plurality of objects into groups according to the estimated relationship. For instance, the classification unit 123 classifies two objects into the same group when it is estimated there exists either of the following two types of relationship between the two objects.

As for the first type of relationship, the classification unit 123 classifies two objects into the same group when it is estimated there exists, between the two objects, relationship in which one of the objects is approaching the other object.

For instance, the classification unit 123 estimates, in the case where the plurality of objects extracted by the extraction unit 121 include a first object of which the category is determined to be a man by the extraction unit 121 and a second object of which the category is determined to be a vehicle by the extraction unit 121, the future distance Df between the first object and the second object predicted by the prediction unit 122 is smaller than the threshold value Ta, and the amplitude of the current velocity Vc2 of the second object estimated by the extraction unit 121 is 0, relationship of a vehicle and a man getting in the vehicle exists between the first object and the second object. That is, the classification unit 123 classifies, if the condition of Df<Ta and Vc2=0 is satisfied with respect to the combination of the first object being a man and the second object being a vehicle, the first object and the second object into the same group. The above "vehicle" includes both of an automobile and a bicycle. Further, for instance, the classification unit 123 estimates, in the case where the plurality of objects extracted by the extraction unit 121 include a first object and a second object of which the categories are each determined to be a man by the extraction unit 121, and the future distance Df between the first object and the second object predicted by the prediction unit 122 is smaller than the threshold value Ta, relationship of men approaching each other exists between the first object and the second object. That is, the classification unit 123 classifies, if the condition of Df<Ta is satisfied with respect to the combination of the first object and the second object each being a man, the first object and the second object into the same group.

As for the second type of relationship, the classification unit 123 classifies two objects into the same group when it is estimated relationship of objects moving in line exists between the two objects. Specifically, the classification unit 123 estimates, in the case where there exist, among the plurality of objects extracted by the extraction unit 121, a first object and a second object of which the categories are each determined to be a moving object by the extraction unit 121, and the following conditions are satisfied, the relationship of objects moving in line exists between the first object and the second object. The first condition is a condition under which a difference of the present distance Dc between the first object and the second object calculated by the extraction unit 121 and the future distance Df between the first object and the second object predicted by the prediction unit 122 is smaller than a threshold value Tb. The second condition is a condition under which the amplitudes of the current velocities Vc1 and Vc2 of the first object and the second object estimated by the extraction unit 121 are larger than 0. The third condition is a condition under which the difference between the amplitudes of the velocities Vc1 and Vc2 is smaller than another threshold value Tc.

That is, the classification unit 123 classifies, if the condition of |Dc−Df|<Tb and |Vc1|>0 and |Vc2|>0 and |Vc1−Vc2|<Tc is satisfied with respect to the combination of the first object and the second object each being a moving object, the first object and the second object into the same group. The first object and the second object of the above case are, for instance, objects of which the categories are each determined to be a bicycle by the extraction unit 121. In that case, the relationship estimated by the classification unit 123 is relationship of bicycles running in line. Note that the "difference" is assumed to be an absolute value. Further, the velocities Vc1 and Vc2 are assumed to be vectors including direction. The classification unit 123 may estimate the relationship using an angle formed by the velocities Vc1 and Vc2.

Specifically, the classification unit 123 estimates, in the case where the second condition, the third condition, and a condition under which the angle formed by the velocities Vc1 and Vc2 is smaller than another threshold value Td are satisfied, the relationship of objects moving in line exists between the first object and the second object. That is, the classification unit 123 classifies, if the condition of |Vc1|>0 and |Vc2|>0 and |Vc1−Vc2|<Tc and "the angle formed by Vc1 and Vc2"<Td is satisfied with respect to the combination of the first object and the second object each being a moving object, the first object and the second object into the same group. Even if such condition is used, as a result, the plurality of objects are classified into the same group based on the difference of the present distance Dc between the first object and the second object calculated by the extraction unit 121 and the future distance Df between the first object and the second object predicted by the prediction unit 122.

The classification unit 123 may estimate various relationship other than the above two types.

The processing unit 124 processes the captured image 101 into a highlight image 102. The highlight image 102 is an image in which the plurality of objects classified by the classification unit 123 are highlighted separately for each group. For instance, the highlight image 102 is an image in which the plurality of objects classified by the classification unit 123 are surrounded by one frame per group. The processing unit 124 inputs the highlight image 102 to the display device 140.

The data storage device 130 is, for instance, an HDD (Hard Disk Drive) or an SSD (Solid State Drive). The data storage device 130 may be mounted on the vehicle 200, brought by the driver to the vehicle 200, or provided outside the vehicle 200. The data storage device 130 stores object data 131 and a relationship table 132. The object data 131 is, for each of the plurality of objects extracted by the extraction unit 121 of the image processing device 120, data in which the calculation result, the determination result, the estimation result, and the like of the extraction unit 121 are recorded. The object data 131 is referenced by the prediction unit 122 of the image processing device 120. The relationship table 132 is a table which previously defines combinations of categories of the objects which have relationship with each other. The relationship table 132 is referenced by the classification unit 123 of the image processing device 120.

The display device 140 is, for instance, an LCD (Liquid Crystal Display) or an HUD (Head-Up Display). The display device 140 is mounted on the vehicle 200. The display device 140 outputs the highlight image 102 input by the processing unit 124 of the image processing device 120. The display device 140 includes an input unit 141 and an output unit 142.

The input unit 141 receives an input of the highlight image 102 from the processing unit 124 of the image processing device 120. That is, the highlight image 102 is input to the input unit 141.

The output unit 142 outputs the highlight image 102 input to the input unit 141.

As discussed above, the highlight image 102 is an image obtained by processing the captured image 101 in which a plurality of objects including at least one moving object are photographed, the image being such that the plurality of objects classified into groups based on the predicted future distance Df between the plurality of objects are, in the image, highlighted separately for each group. In the present embodiment, upon grouping the objects, the future distance Df between the objects is taken into consideration. Therefore, compared with a case without consideration of the future distance Df between the objects, more appropriate grouping is carried out. That is, even if the present distance Dc between the objects is small, when the future distance Df between the objects is predicted to become large, in the highlight image 102, such objects are highlighted separately. Therefore, the driver of the vehicle 200 is able to easily visually recognize these objects separately. As discussed above, in the present embodiment, the objects are highlighted separately for each unit the driver should visually recognize, according to the future distance Df between the objects, and thereby the safe driving is supported.

The image processing device 120, the data storage device 130, and the display device 140 may be united; any two of them may be united and the other is separated; or each of them may be separated. For instance, the display device 140 is implemented as a navigation device, a DA (Display Audio), or an HUD mounted on the vehicle 200. The image processing device 120 is implemented as a portable terminal such as a smartphone, a tablet, or a cellular phone. Alternatively, the image processing device 120 is implemented as a server computer. Alternatively, the image processing device 120 is implemented as a navigation device together with the display device 140. The data storage device 130 is implemented as the portable terminal or the server computer together with the image processing device 120. Alternatively, the data storage device 130 is implemented as the navigation device together with the display device 140. Alternatively, the data storage device 130 is implemented as a storage medium being separate from the image processing device 120 and the display device 140. The portable terminal is brought by the driver to the vehicle 200, and carries out wired or wireless communication with the imaging device 110 and the display device 140. The server computer is provided at a data center or the like, and carries out communication with the imaging device 110 and the display device 140 via network such as the Internet.

Note that the system according to the present embodiment may be a display system other than the in-vehicle display system 100. That is, the present embodiment can be applied to the use other than the support for the driving of the vehicle 200. For instance, the present embodiment can be also applied to the support for security monitoring of a house, an office, and the like. In that case, the imaging device 110 and the display device 140 are provided appropriately at a place other than the vehicle 200.

*Explanation of Operation*

Figure 2:
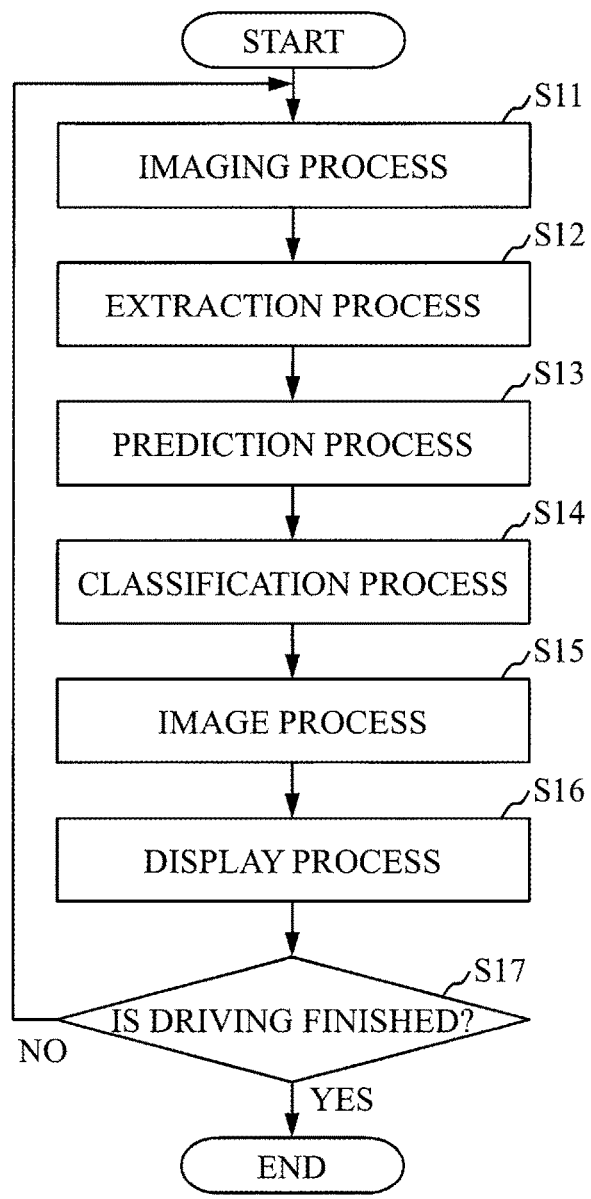
FIG. 2 is a flowchart illustrating an operation of the in-vehicle display system according to the first embodiment.
Figures 3, 4:
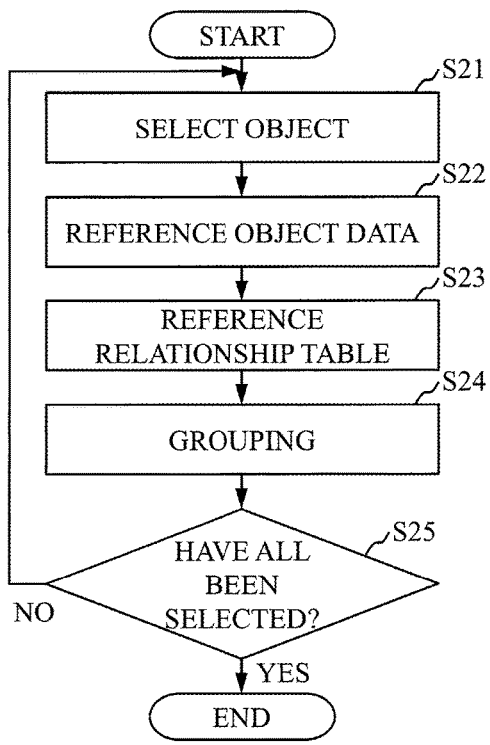
FIG. 3 is a table illustrating an example of object data according to the first embodiment.
FIG. 4 is a flowchart illustrating a procedure of a classification process according to the first embodiment.

FIG. 2 is a flowchart illustrating an operation of the in-vehicle display system 100, which corresponds to a display method according to the present embodiment. FIG. 3 is a table illustrating an example of the object data 131.

S11 of FIG. 2 is an imaging process. S12 of FIG. 2 is an extraction process. S13 of FIG. 2 is a prediction process. S14 of FIG. 2 is a classification process. S15 of FIG. 2 is an imaging process. S16 of FIG. 2 is a display process. S12 to S15 are the operation of the image processing device 120 corresponding to an image processing method according to the present embodiment or processing procedure of an image processing program according to the present embodiment.

At S11 of FIG. 2, the imaging device 110 photographs the surroundings of the vehicle 200 to acquire the captured image 101. For instance, if the imaging device 110 is a stereo camera, the captured image 101 is a three-dimensional still image or a video image in which the surroundings of the vehicle 200 are captured. If the imaging device 110 is a radar, the captured image 101 is a radar image indicating a distance to an obstacle around the vehicle 200.

At S12 of FIG. 2, the extraction unit 121 of the image processing device 120 extracts objects from the captured image 101 acquired at S11. The extraction unit 121 judges attributes of the extracted objects.

Specifically, the extraction unit 121 extracts, for each extracted object, the feature quantity of the object from the captured image 101 acquired at S11. For instance, the data storage device 130 previously stores, for each category of objects, a reference value or a reference range of the feature quantity of objects. The extraction unit 121 compares, using a discriminator which is a software having a function of pattern recognition such as a neural network or a machine learning, the extracted feature quantity with the reference value or the reference range, thereby determining the category of the extracted object. The extraction unit 121 writes data in which the current time, the extracted feature quantity, and the determined category are recorded in the data storage device 130 as the object data 131 illustrated in FIG. 3.

The extraction unit 121 calculates, for each extracted object, the current relative position of the object from the captured image 101 acquired at S11. "Current relative position" is, for instance, the present distance and direction to the object from the vehicle 200. For instance, if the imaging device 110 is a stereo camera, the extraction unit 121 calculates, based on the parallax of the stereo camera, the distance and the direction to the object from the vehicle 200. If the imaging device 110 is a radar, the extraction unit 121 calculates the distance and the direction from the observation value of the radar. As illustrated in FIG. 3, the current relative position calculated by the extraction unit 121 is also recorded in the object data 131.

The extraction unit 121 calculates, for each extracted object, the present distance Dc which is a difference between the calculated current relative position and the current relative position of another object. Though not illustrated in FIG. 3, the present distance Dc calculated by the extraction unit 121 may also be recorded in the object data 131.

The extraction unit 121 judges, for each extracted object, whether or not the same object is extracted also at the previous time by comparing the feature quantity extracted at this time with the feature quantity extracted at the previous time. The extraction unit 121 estimates, when it is judged the same object is extracted also at the previous time, the current velocity Vc of the object from the calculated current relative position and the relative position calculated at the previous time. For instance, the extraction unit 121 reads, from the data storage device 130, the object data 131 in which the time when the captured image 101 is photographed by the imaging device 110 at the previous time and the feature quantity which is close to the feature quantity extracted at this time are recorded. Whether or not the feature quantity extracted at this time and the feature quantity extracted at the previous time is close is judged using the aforementioned discriminator. The extraction unit 121 calculates the current velocity Vc of the object from information such as the relative position recorded in the read object data 131, the current relative position calculated at this time, the time recorded in the read object data 131, and the current time. If the position of the vehicle 200 has changed because the vehicle 200 has been running, the extraction unit 121 calculates the current velocity Vc of the object after correcting the relative position recorded in the read object data 131 based on the change of the position of the vehicle 200. Note that the extraction unit 121 may calculate an average velocity of the object not only by referencing the current relative position and a relative position of the previous time but from a series of the time-series data of the relative position. As illustrated in FIG. 3, the current velocity Vc estimated by the extraction unit 121 is also recorded in the object data 131.

At S13 of FIG. 2, the prediction unit 122 of the image processing device 120 predicts, for each object of which the category is determined to be a moving object at S12, the movement of the object with reference to the object data 131 written at S12 in the data storage device 130 and the object data 131 written in the past. For the movement prediction, for instance, a Kalman filter or a particle filter can be used. In the case where the category determined at S12 is a man, the prediction unit 122 determines whether the man is in a posture to start running by posture estimation, and predicts the future velocity. As for a technique of the posture estimation, for instance, a technique to identify the posture by learning posture of a man who starts running and posture of a man who does not, using the aforementioned discriminator, can be used.

Specifically, the prediction unit 122 judges, for each object of which the category is determined to be a moving object at S12, whether or not the same object has been extracted consecutively from the past by comparing the feature quantity extracted at S12 with the feature quantity extracted by the extraction unit 121 in the past. The prediction unit 122 predicts, in the case where it is judged the same object has been extracted consecutively from the past, the future relative position of the object from the history of the relative position and the velocity. "Future relative position" is, for instance, the future distance and direction to the object from the vehicle 200. For instance, the prediction unit 122 reads, from the data storage device 130, the object data 131 in which the feature quantity being close to the feature quantity extracted at S12 is recorded. Whether or not the feature quantity extracted at S12 and the feature quantity extracted in the past are close is judged using the aforementioned discriminator. The prediction unit 122 analyzes the time-series variation of the relative position and the velocity of the object, from the relative position, the velocity, and the time recorded in the read object data 131, the current relative position calculated at S12, the velocity estimated at S12, and the current time. If the position of the vehicle 200 has changed because the vehicle 200 has been running, the prediction unit 122 analyzes the time-series variation of the relative position and the velocity of the object, after correcting the relative position recorded in the read object data 131 based on the change of the position of the vehicle 200. The prediction unit 122 predicts, from the analysis result, the future relative position of the object.

The prediction unit 122 calculates, for each object of which the category is determined to be a moving object at S12, the future distance Df which is the difference between the predicted future relative position and the future relative position of another object.

At S14 of FIG. 2, the classification unit 123 of the image processing device 120 classifies, based on the future distance Df predicted at S13, the objects extracted at S12 into groups. That is, the classification unit 123 decides, for each object extracted at S12, a group to which the object belongs. Details of S14 will be discussed later.

At S15 of FIG. 2, the processing unit 124 of the image processing device 120 processes the captured image 101 acquired at S11 to generate the highlight image 102. The highlight image 102 is an image in which the objects extracted at S12 are highlighted separately for each group decided at S14. For instance, the highlight image 102 is an image in which the objects extracted at S12 are surrounded by one frame per group decided at S14.

At S16 of FIG. 2, the display device 140 outputs the highlight image 102 generated at S15.

At S17 of FIG. 2, if the driving of the vehicle 200 has finished, the flow terminates. If the driving of the vehicle 200 has not finished, the flow returns to S11. "Finishing" of the driving of the vehicle 200 is, for instance, to stop an engine or a motor which is a driving source of the vehicle 200.

Figures 5, 6:
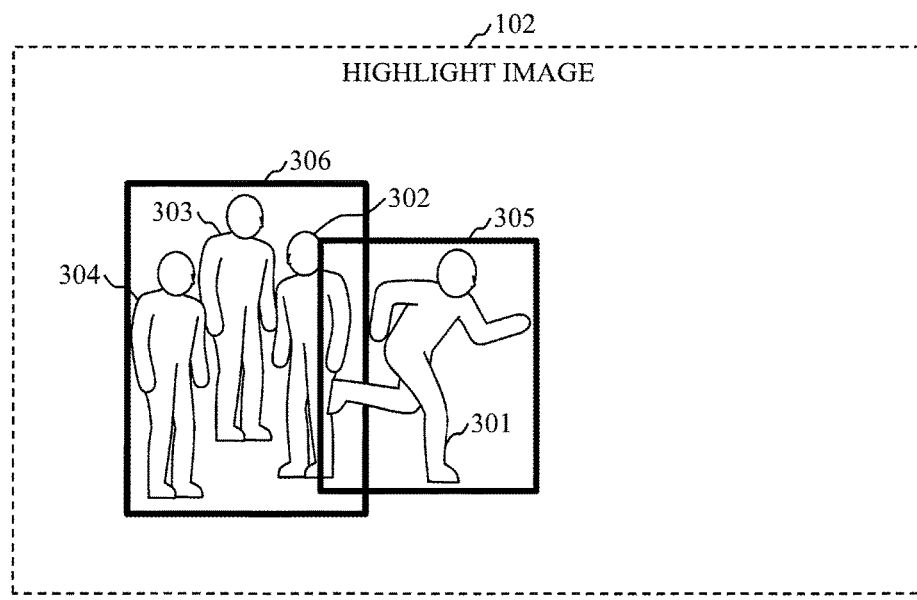
FIG. 5 is a table illustrating an example of a relationship table according to the first embodiment.
FIG. 6 is a diagram illustrating an example of a highlight image according to the first embodiment.

FIG. 4 is a flowchart illustrating a procedure of the classification process which is S14 of FIG. 2. FIG. 5 is a table illustrating an example of the relationship table 132.

At S21 of FIG. 4, the classification unit 123 of the image processing device 120 selects, among the objects extracted at S12 of FIG. 2, a first object and a second object which are two arbitrary objects.

At S22 of FIG. 4, the classification unit 123 identifies the category of the first object and the category the second object by referencing the object data 131 written in the data storage device 130 at S12 of FIG. 2 regarding the first object and the second object selected at S21, from the data storage device 130. That is, the classification unit 123 identifies the combination of the categories of the first object and the second object selected at S21.

At S23 of FIG. 4, the classification unit 123 searches for the combination of the categories identified at S22 in the relationship table 132 stored in the data storage device 130.

As illustrated in FIG. 5, the relationship table 132 defines, for each combination of categories of two objects being a "first object" and a "second object", the "condition" and whether or not there exists "relationship" between the "first object" and the "second object" when the "condition" is satisfied. When some "condition" is satisfied, if it is defined that "relationship" exists in the case where that "condition" is satisfied, then the "first object" and the "second object" are classified into the same group. On the other hand, when some "condition" is satisfied, if it is defined that "relationship" does not exist in the case where that "condition" is satisfied, then the "first object" and the "second object" are classified into different groups.

For instance, with respect to the combination of a man and another man, it is defined that when the condition C1 under which the future distance Df between the man and the other man is larger than the threshold value Ta is satisfied, it should be estimated there exists no specific relationship.

With respect to the combination of a man and an automobile, it is defined that when the condition C2 under which the future distance Df between the man and the automobile is smaller than the threshold value Ta, and the amplitude of the current velocity Vc2 of the automobile is 0 is satisfied, it should be estimated there exists relationship of an automobile and a man getting in the automobile.

With respect to the combination of a man and a bicycle, it is defined that when the condition C3 under which the future distance Df between the man and the bicycle is smaller than the threshold value Ta, and the amplitude of the current velocity Vc2 of the bicycle is 0 is satisfied, it should be estimated there exists relationship of a bicycle and a man getting on the bicycle.

With respect to the combination of a bicycle and another bicycle, it is defined that when the condition C4 under which the difference of the present distance Dc between the bicycle and the other bicycle and the future distance Df between the bicycle and the other bicycle is smaller than the threshold value Tb, the amplitudes of the current velocities Vc1 and Vc2 of the bicycle and the other bicycle are larger than 0, and the difference of the amplitudes of the current velocities Vc1 and Vc2 of the bicycle and the other bicycle is smaller than the threshold value Tc is satisfied, it should be estimated there exists relationship of bicycles running in line.

With respect to the combination of an automobile and another automobile, it is defined that when the condition C5 being always true is satisfied, it should be estimated there exists no specific relationship. That is, it is defined that it should be estimated there exists no relationship without condition.

At S24 of FIG. 4, the classification unit 123 determines whether or not the future distance Df between the first object and the second object predicted at S13 of FIG. 2 satisfies the condition defined in the relationship table 132 with respect to the combination of the categories searched at S23. The classification unit 123 further determines, according to the necessity, whether or not any or all of the present distance Dc between the first object and the second object calculated at S12 of FIG. 2, the current velocity Vc1 of the first object estimated at S12 of FIG. 2, and the current velocity Vc2 of the second object estimated at S12 of FIG. 2 satisfy the condition defined in the relationship table 132 with respect to the combination of the categories searched at S23. The classification unit 123 determines, in the case where the condition is determined to be satisfied, whether or not the relationship table 132 defines that relationship exists between the first object and the second object if the condition is satisfied. If the relationship table 132 defines there exists relationship, the classification unit 123 classifies the first object and the second object into the same group. On the other hand, in the case where the classification unit 123 determines the condition is not satisfied, or the relationship table 132 defines there exists no relationship, the classification unit 123 classifies the first object and the second object into different groups.

At S25 of FIG. 4, if all combinations of two objects being able to be selected from the objects extracted at S12 of FIG. 2 have been selected at S21, the flow terminates. If there exists any combination of two objects which has not been selected, the flow returns to S21.

FIGS. 6 through 9 are diagrams illustrating examples of the highlight image 102.

In the example of FIG. 6, one man 301 and three men 302 to 304 are surrounded by different frames 305 and 306.

For instance, it is assumed that, among the four men 301 to 304 who are standing closely with each other, the one man 301 is in a posture to start running. In this case, although the present distance Dc between the one man 301 and the remaining three men 302 to 304 is small, it is considered that the future distance Df will be large. When the man 301 is the first object, the man 302 is the second object, and the future distance Df between the man 301 and the man 302 predicted at S13 of FIG. 2 is larger than the threshold value Ta, the above condition C1 is satisfied. The classification unit 123 can estimate, by referencing the relationship table 132, when the condition C1 is satisfied, there exists no specific relationship. Accordingly, at S24 of FIG. 4, the classification unit 123 estimates no relationship exists between the man 301 and the man 302, and classifies the man 301 and the man 302 into different groups. On the other hand, the classification unit 123 classifies, based on non-illustrated different definition defined in the relationship table 132, the man 302 and the man 303 into the same group. In the same manner, the classification unit 123 classifies the man 302 and the man 304 into the same group. At S15 of FIG. 2, the processing unit 124 generates the highlight image 102 as illustrated in FIG. 6.

Figure 7:
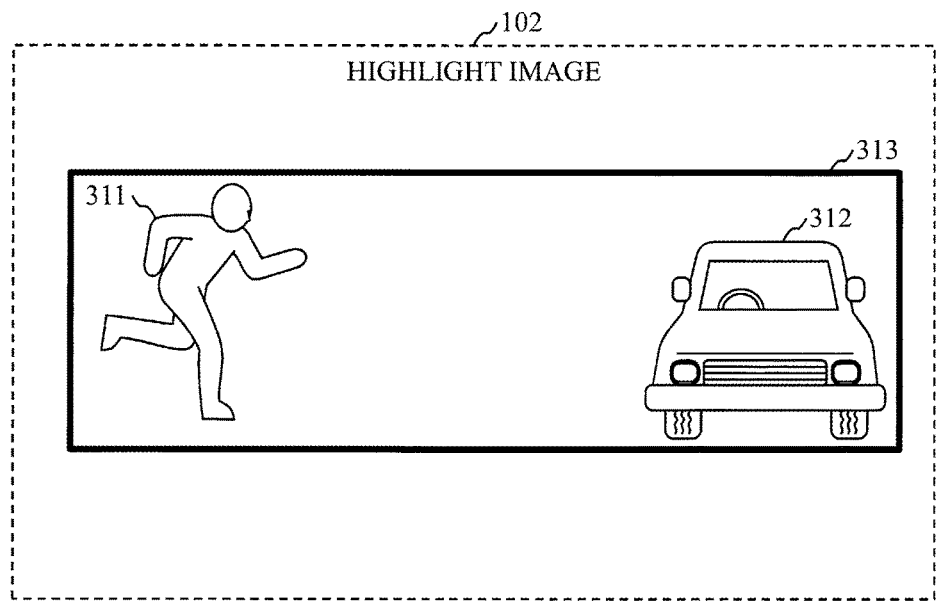
FIG. 7 is a diagram illustrating an example of the highlight image according to the first embodiment.

In the example of FIG. 7, a man 311 and an automobile 312 are surrounded together by one frame 313.

For instance, it is assumed that, away from the parked automobile 312, the man 311 is approaching the automobile 312. In this case, although the present distance Dc between the man 311 and the automobile 312 is large, the future distance Df is considered to become 0. When the man 311 is the first object. the automobile 312 is the second object, the future distance Df between the man 311 and the automobile 312 predicted at S13 of FIG. 2 is smaller than the threshold value Ta, and the amplitude of the current velocity Vc2 of the automobile 312 estimated at S12 of FIG. 2 is 0, the above condition C2 is satisfied. The classification unit 123 can estimate, by referencing the relationship table 132, when the condition C2 is satisfied, there exists the relationship of an automobile and a man getting in the automobile. Accordingly, at S24 of FIG. 4, the classification unit 123 classifies the man 311 and the automobile 312 into the same group. At S15 of FIG. 2, the processing unit 124 generates the highlight image 102 as illustrated in FIG. 7.

Figure 8:
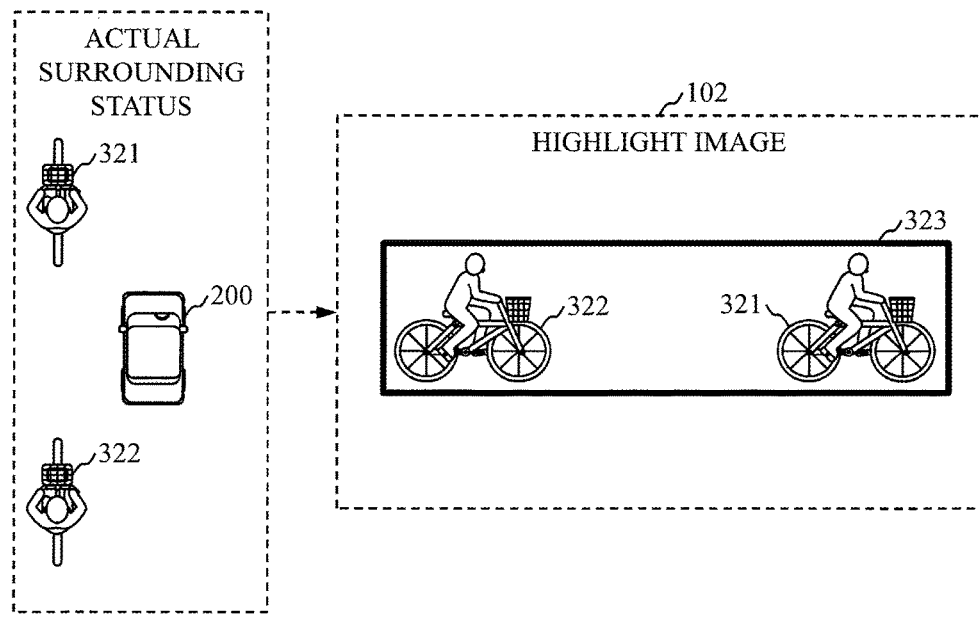
FIG. 8 is a diagram illustrating an example of the highlight image according to the first embodiment.

In the example of FIG. 8, two bicycles 321 and 322 are surrounded together by one frame 323.

For instance, it is assumed that the two bicycles 321 and 322 are running in line. In this case, it is considered there is little difference of the present distance Dc and the future distance Df between the two bicycles 321 and 322. When the bicycle 321 is the first object, the bicycle 322 is the second object, the difference of the present distance Dc between the bicycle 321 and the bicycle 322 calculated at S12 of FIG. 2 and the future distance Df between the bicycle 321 and the bicycle 322 predicted at S13 of FIG. 2 is smaller than the threshold value Tb, the amplitudes of the current velocities Vc1 and Vc2 of the bicycle 321 and the bicycle 322 estimated at S12 of FIG. 2 are larger than 0, and the difference of the amplitudes of the current velocities Vc1 and Vc2 of the bicycle 321 and the bicycle 322 estimated at S12 of FIG. 2 is smaller than the threshold value Tc, regardless of the present distance Dc between the bicycle 321 and the bicycle 322 calculated at S12 of FIG. 2, the above condition C4 is satisfied. The classification unit 123 can estimate, by referencing the relationship table 132, when the condition C4 is satisfied, there exists the relationship of bicycles running in line. Accordingly, at S24 of FIG. 4, the classification unit 123 classifies the bicycle 321 and the bicycle 322 into the same group. At S15 of FIG. 2, the processing unit 124 generates the highlight image 102 as illustrated in FIG. 8.

Note that, in the above example, the classification unit 123 may determine, instead of whether or not the condition C4 is satisfied, or in addition to whether or not the condition C4 is satisfied, from the result of the movement prediction of the posterior bicycle 322 at S13 of FIG. 2, whether or not the posterior bicycle 322 is tracing the movement locus of the anterior bicycle 321.

Figures 9, 10:
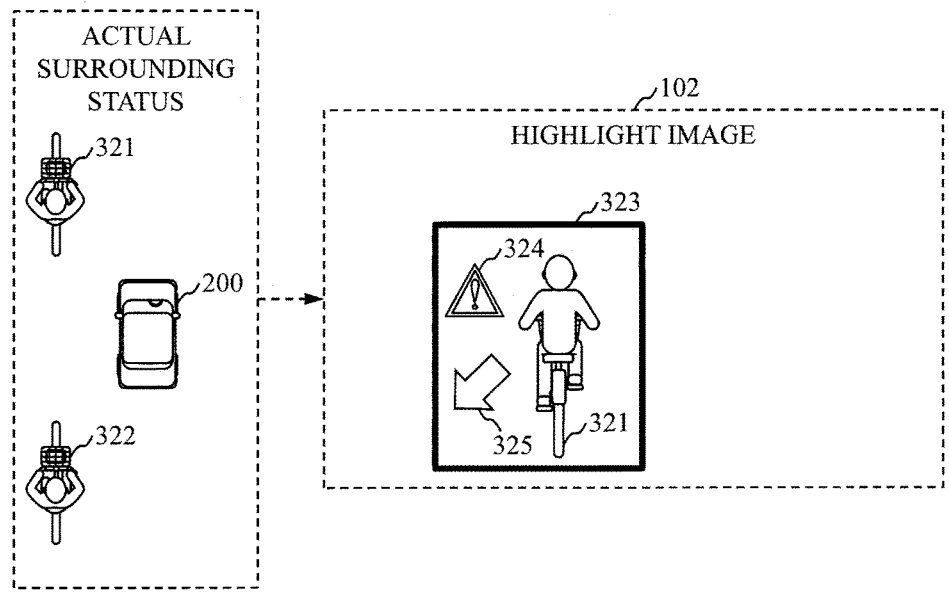
FIG. 9 is a diagram illustrating an example of the highlight image according to the first embodiment.
FIG. 10 is a table illustrating an example of a relationship table according to a second embodiment.

Further, in the above example, the processing unit 124 may generate, instead of the highlight image 102 as illustrated in FIG. 8, the highlight image 102 as illustrated in FIG. 9. The highlight image 102 illustrated in FIG. 8 is an image in which a side of the vehicle 200 is photographed; the two bicycles 321 and 322 captured in the image are surrounded together by one frame 323. On the other hand, the highlight image 102 illustrated in FIG. 9 is an image in which a front of the vehicle 200 is photographed; the anterior bicycle 321 captured in the image, and a mark 324 and an arrow 325 being substitutes for the posterior bicycle 322, which is not captured in the image, are surrounded together by one frame 323. In the highlight image 102 illustrated in FIG. 9, the mark 324 and the arrow 325 can be deemed as one object.

*Explanation of Effect*

In the present embodiment, objects are classified into groups regardless of the present distance Dc between the objects and based on the future distance Df between the objects. Therefore, according to the present embodiment, it is possible to appropriately classify, with respect to the objects which are to be highlighted separately for each group, the objects which should be visually recognized separately and the objects which should be visually recognized together.

In the example of FIG. 6, among the four men 301 to 304, the man 301 is in a posture to start running. Therefore, the image processing device 120 predicts, although the present distance Dc between the one man 301 and the remaining three men 302 to 304 is small, the future distance Df will be large. The image processing device 120 generates the highlight image 102 in which the one man 301 and the remaining three men 302 to 304 are surrounded by the different frames 305 and 306, respectively. The driver who looks at the highlight image 102 can visually recognize, at least from the moment when the man 301 starts running, the man 301 separately from the remaining three men 302 to 304. Consequently, the driver can easily pay attention to the man 301 who starts running, and thereby the safe driving is enabled.

Further, in the present embodiment, the objects are classified into groups according to the relationship between the objects. Therefore, according to the present embodiment, it is possible to more appropriately classify, with respect to the objects which are to be highlighted separately for each group, the objects which should be visually recognized separately and the objects which should be visually recognized together.

In the example of FIG. 7, the man 311 is approaching the automobile 312. Therefore, the image processing device 120 predicts, although the present distance Dc between the man 311 and the automobile 312 is large, the future distance Df will be small. The image processing device 120 estimates there exists the relationship of an automobile and a man getting in the automobile between the man 311 and the automobile 312. The image processing device 120 generates the highlight image 102 in which the man 311 and the automobile 312 are surrounded together by one frame 313. The driver who looks at the highlight image 102 can visually recognize, before the man 311 gets into the automobile 312, the man 311 and the automobile 312 together. Consequently, the driver can easily pay attention to other objects, and can recognize the area between objects as an area to watch out, and thereby the safe driving is enabled.

Second Embodiment

For the present embodiment, differences from the first embodiment will be mainly explained.

In the following, a configuration of a system according to the present embodiment, an operation of the system according to the present embodiment, and an effect of the present embodiment will be explained in order.

*Explanation of Configuration*

A configuration of an in-vehicle display system 100 according to the present embodiment is the same as the one of the first embodiment illustrated in FIG. 1.

In the present embodiment, the extraction unit 121 of the image processing device 120 determines, with respect to a man, whether or not the category of the object is a child. The extraction unit 121 calculates the amount of change in movement Ma of the object of which the category is determined to be a child or an animal.

The extraction unit 121 further determines, with respect to a man, whether or not the category of the object is a man who has got out of the driver's seat of an automobile, and whether or not the category of the object is a man who has got out of the rear seat of the automobile.

In the present embodiment, the classification unit 123 of the image processing device 120 classifies, in the case where the plurality of objects extracted by the extraction unit 121 include a first object of which the category is determined to be a man by the extraction unit 121 and a second object of which the category is determined to be a child or an animal by the extraction unit 121, and the amount of change in movement Ma of the second object calculated by the extraction unit 121 is larger than another threshold value Te, the first object and the second object into different groups. Note that the first object may be an object of which the category is determined to be not a child by the extraction unit 121 or may be an object of which the category is determined to be a child by the extraction unit 121.

In the present embodiment, the processing unit 124 of the image processing device 120 uses, in the case where among two or more objects which have been classified before into the same group by the classification unit 123, at least one object is classified into a group different from the remaining objects by the classification unit 123, different formats of highlighting in the highlight image 102 for the at least one object and the remaining objects. For instance, it is considered when an object which has been included in group A leaves group A to form group B being an independent group, the object belonging to group A is surrounded by a frame having the same thickness and color as before and the object belonging to group B is surrounded by a frame having more thickness than group A or a color different from the group A. Alternatively, it is considered the object belonging to group B is surrounded by a frame having the same thickness and color as the frame which has been used for surrounding group A, and the object belonging to group A is surrounded by a frame having more thickness than group B or a color different from group B. In the former case, stronger attention to the object belonging to group B can be evoked. In the latter case, stronger attention to the object belonging to group A can be evoked.

*Explanation of Operation*

Hereinafter, an operation of the in-vehicle display system 100, which corresponds to a display method according to the present embodiment will be explained with reference to FIG. 2.

S11 of FIG. 2 is the same as the one of the first embodiment.

At S12 of FIG. 2, the extraction unit 121 judges, for each object of which the category is determined to be a child or an animal, whether or not the same object has been extracted consecutively from the past by comparing the feature quantity extracted at S12 with the feature quantity extracted in the past by the extraction unit 121. The extraction unit 121 calculates, if it is judged the same object has been extracted consecutively from the past, from the history of the relative position and the velocity, the amount of change in movement Ma of the object. Note that the extraction unit 121 may compute, instead of the history of the relative position and the velocity, the optical flow of the object, and calculate, from the computation result, the amount of change in movement Ma of the object. Though not illustrated, in the object data 131 written in the data storage device 130 by the extraction unit 121, the amount of change in movement Ma calculated by the extraction unit 121 is also recorded.

The other operation of the extraction unit 121 at S12 of FIG. 2 is the same as the one of the first embodiment.

S13 and S14 of FIG. 2 are the same as the ones of the first embodiment. However, in the present embodiment, a configuration of the relationship table 132 is different from the one of the first embodiment.

FIG. 10 is a table illustrating an example of the relationship table 132.

As illustrated in FIG. 10, the relationship table 132 defines, for each combination of categories of two objects being a "first object" and a "second object", in addition to the "condition" and "relationship" which are the same as those illustrated in FIG. 5, the "to-be-emphasized-after-cancellation object" which specifies which object to be highlighted more strongly, out of the "first object" and the "second object", in the case where the grouping has been cancelled. "Case where the grouping has been cancelled" means the case where two objects having been classified in the same group are classified into different groups.

For instance, with respect to the combination of a man and an automobile, it is defined that when the condition C6 under which the man has got out of the driver's seat of the automobile is satisfied, the man is to be highlighted more strongly, and when the condition C7 under which the man has got out of the rear seat of the automobile is satisfied, the automobile is to be highlighted more strongly.

With respect to the combination of a man and an animal, it is defined that when the condition C8 under which the future distance Df between the man and the animal is smaller than the threshold value Ta is satisfied, it should be estimated there exists relationship of an animal and a man with the animal, and when the condition C9 under which the amount of change in movement Ma of the animal is larger than the threshold value Te is satisfied, the animal is to be highlighted more strongly.

Note that when a plurality of conditions defined for the combination of categories of two objects are satisfied at the same time, if the condition under which there exists relationship and the condition under which no relationship exists are mixed in the plurality of conditions, the condition under which no relationship exists has priority. For instance, with respect to the combination of a man and an animal, even if both of the condition C8 and the condition C9 are satisfied, the condition C9 has priority, and thus the man and the animal are classified into different groups. When two or more conditions under which it is estimated no relationship exists are satisfied at the same time, for instance, priorities which has been previously set for the individual conditions are applied.

For instance, it is assumed that a man is walking with an animal. When the man is the first object, the animal is the second object, and the future distance Df between the man and the animal predicted at S13 of FIG. 2 is smaller than the threshold value Ta, the above condition C8 is satisfied. The classification unit 123 can estimate, by referencing the relationship table 132, when the condition C8 is satisfied, there exists the relationship of an animal and a man with the animal. Accordingly, at S24 of FIG. 4, the classification unit 123 classifies the man and the animal into the same group.

It is assumed, after that, sudden actions of the animal frequently occurs. When the amount of change in movement Ma of the animal calculated at S12 of FIG. 2 is larger than the threshold value Te, the condition C9 which has a higher priority than the condition C8 is satisfied. The classification unit 123 can estimate, by referencing the relationship table 132, when the condition C9 is satisfied, there exists no specific relationship. Accordingly, at S24 of FIG. 4, the classification unit 123 classifies the man and the animal into different groups. Note that it may be also considered the classification unit 123 estimates, when the condition C9 is satisfied, relationship of a man and a fierce animal accompanying the man, and thereby classifying the man and the animal into different groups.

As discussed above, the classification unit 123 cancels the grouping when the condition defined in the relationship table 132, under which it is estimated no relationship exists, is satisfied.

At S15 of FIG. 2, the processing unit 124 processes the captured image 101 acquired at S11 to generate the highlight image 102. In the case where among the two or more objects which have been classified into the same group at S14, at least one object is classified into a group different from the remaining objects at S14, the processing unit 124 generates, by referencing the relationship table 132 stored in the data storage device 130, an image in which the object classified in one of the groups is highlighted more strongly than the object classified in the other group, as the highlight image 102.

*Explanation of Effect*

In the present embodiment, in the case where among two or more objects which have been classified before into the same group, at least one object is classified into a group different from the remaining objects, different formats of highlighting are used for the at least one object and for the remaining objects. Therefore, according to the present embodiment, it is possible to clearly indicate that the object which has been visually recognized together with the other objects is changed to the object which should be visually recognized individually.

For instance, when a child walking with an adult or an animal accompanying its owner starts acting violently, the child or the animal should be watched out. In the present embodiment, in such a case, the grouping is cancelled, and the attention is easily paid to the child or the animal.

When a man gets out of an automobile, the man or the automobile should be watched out. In the present embodiment, in such a case, the grouping is cancelled, and the attention is easily paid to the man or the automobile.

Figure 11:
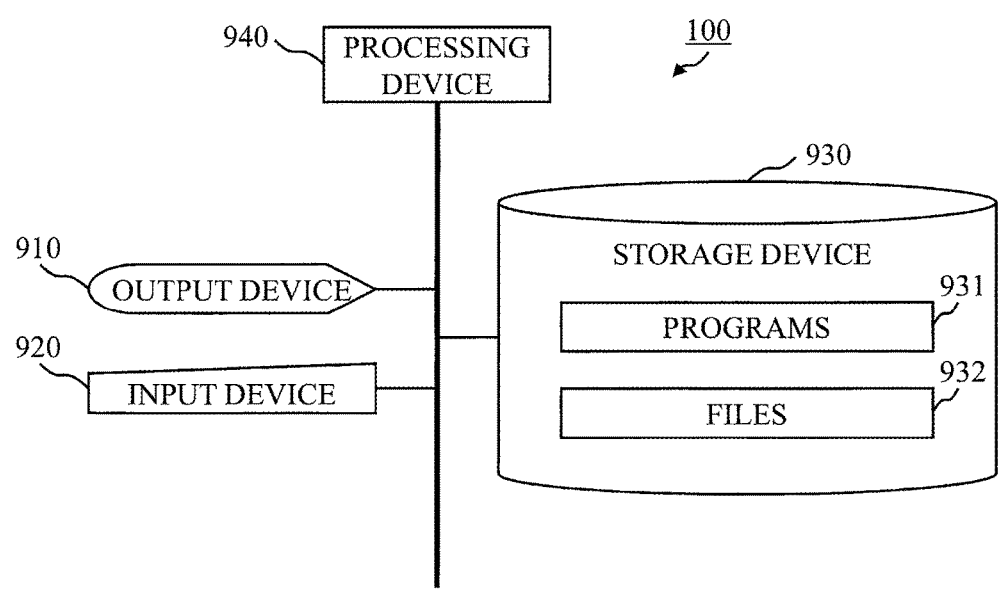
FIG. 11 is a diagram illustrating an example of a hardware configuration of the in-vehicle display system according to the embodiments of the present invention.

FIG. 11 is a diagram illustrating an example of a hardware configuration of the in-vehicle display system 100 according to the embodiment of the present invention.

In FIG. 11, the in-vehicle display system 100 is a computer, and provided with hardware such as an output device 910, an input device 920, a storage device 930, and a processing device 940. The hardware is used by each unit of the image processing device 120 such as the extraction unit 121, the prediction unit 122, the classification unit 123, and the processing unit 124.

The output device 910 is, for instance, the display device 140, a printer, or a communication module. The output device 910 is used by each unit of the image processing device 120 for output or transmission of data, information, and signals.

The input device 920 is, for instance, the imaging device 110, a keyboard, a mouse, a touch panel, or a communication module. The input device 920 is used by each unit of the image processing device 120 for input or reception of data, information, and signals.

The storage device 930 is, for instance, the data storage device 130, a ROM (Read Only Memory), a RAM (Random Access Memory), an HDD, or an SSD. The storage device 930 stores programs 931 and files 932. The programs 931 include a program for executing the process of each unit of the image processing device 120. The files 932 include data, information, signals, and the like on which calculation, processing, reading, writing, usage, input, output, and the like are carried out by each unit of the image processing device 120. For instance, the files 932 to be stored in the data storage device 130 include the object data 131 and the relationship table 132.

The processing device 940 is, for instance, a CPU (Central Processing Unit) or a GPU (Graphics Processing Unit). The processing device 940 is connected to other hardware devices via a bus and the like, and controls these hardware devices. The processing device 940 reads the programs 931 from the storage device 930 and executes the programs 931. The processing device 940 is used by each unit of the image processing device 120 for calculation, processing, reading, writing, usage, input, output, and the like. Note that multiple processing devices 940 may cooperate to execute the programs 931. For instance, the process of the processing unit 124 to process the captured image 101 into the highlight image 102 may be executed by a GPU, and the other processes of the extraction unit 121, the prediction unit 122, and the classification unit 123 may be executed by a CPU.

Each unit of the image processing device 120 may be the ones of which "unit" is replaced with "circuit", "device", or "apparatus". Further, each unit of the image processing device 120 may be the ones of which "unit" is replaced with "step", "procedure", or "process". That is, each unit of the image processing device 120 is implemented by only software, only hardware, or a combination of software and hardware. The software may be previously stored as a program 931 in the storage device 930, or may be downloaded from network such as the Internet to be stored in the storage device 930, or moved or copied from removable recording medium to be stored in the storage device 930. The program 931 is to cause the computer to function as each unit of the image processing device 120. Or, the program 931 is to cause the computer to execute the process of each unit of the image processing device 120. The hardware may be, for instance, an integrated circuit such as an ASIC (Application Specific Integrated Circuit) or an FPGA (Field Programmable Gate Array), or may be a combination of discrete elements.

Hereinbefore, the embodiments of the present invention have been explained; some out of the embodiments may be implemented in combination. Alternatively, any one or some out of the embodiments may be partially implemented. For instance, out of those explained as "units" in the explanation of the embodiments, any one may be adopted, or an arbitrary combination of some may be adopted. Note that the present invention is not limited to the embodiments and various alteration can be done according to the necessity.

REFERENCE SIGNS LIST

100: in-vehicle display system; 101: captured image; 102: highlight image; 110: imaging device; 120: image processing device; 121: extraction unit; 122:

prediction unit; 123: classification unit; 124: processing unit; 130: data storage device; 131: object data; 132: relationship table; 140: display device; 141: input unit; 142: output unit; 200: vehicle; 301 to 304: man; 305 and 306: frame; 311: man; 312: automobile; 313: frame; 321 and 322: bicycle; 323: frame; 324: mark; 325: arrow; 910: output device; 920: input device; 930: storage device; 931: program; 932: file; 940: processing device

The invention claimed is:

1. An image processing device for a vehicle, comprising:
a memory storing computer-executable instructions; and
a processor which executes the stored instructions, which when executed cause the processor to:
extract a plurality of objects including at least one moving object from a captured image in which the plurality of objects are photographed;
determine a future distance between the plurality of objects extracted by the processor;
classify into groups the plurality of objects extracted by the processor based on the future distance determined by the processor, to alert a driver to different objects near a vehicle; and
process the captured image into a highlight image in which the plurality of objects classified by the processor are highlighted separately for each group.

2. The image processing device according to claim 1, wherein the stored instructions executed by the processor further cause the processor to classify, among the plurality of objects extracted by the processor, objects of which the future distance between each other determined by the processor is larger than a threshold value, into different groups.

3. The image processing device according to claim 1, wherein the stored instructions executed by the processor further cause the processor to classify, among the plurality of objects extracted by the processor, objects of which the future distance between each other determined the processor is smaller than a threshold value, into a same group.

4. The image processing device according to claim 1, wherein the stored instructions executed b the processor further cause the processor to, in response to at least two of objects which have been classified before into a same group by the processor, at least one object is classified into a group different from remaining objects by the processor, execute different formats of highlighting in the highlight image for the at least one object and the remaining objects.

5. The image processing device according to claim 1, wherein the stored instructions, executed by the processor, further cause the processor to:
determine a category of each of the extracted plurality of objects, and
judge whether or not a posture of an object of which the category is determined to be a person by the processor is a posture to start running, and based on a judgement result, determine the future distance between the object of which the category is determined to be the person by the processor and another object extracted by the processor.

6. The image processing device according to claim 1, wherein the highlight image is an image in which the plurality of objects classified by the processor are surrounded by one frame per group.

7. An in-vehicle display system comprising:
the image processing device according to claim 1;
an imaging device mounted on a vehicle, the imaging device photographing surroundings of the vehicle to acquire the captured image; and
a display device mounted on the vehicle, the display device outputting the highlight image.

8. The image processing device according to claim 1, wherein the stored instructions executed by the processor further cause the processor to:
determine a category of each of the extracted plurality of objects, and
estimate, based on the future distance determined by the processor and the category determined by the processor, a relationship between the plurality of objects extracted by the processor, and classify the plurality of objects into groups according to the estimated relationship.

9. The image processing device according to claim 8, wherein the stored instructions executed by the processor further cause the processor to:
estimate a current velocity of an object of which the category is determined to be a vehicle, and
classify, in a case where the plurality of objects extracted by the processor include a first object of which the category is determined to be a person by the processor and a second object of which the category is determined to be a vehicle by the processor, the future distance between the first object and the second object determined by the processor is smaller than a threshold value, and an amplitude of the current velocity of the second object estimated by the processor is 0, the first object and the second object into a same group.

10. The image processing device according to claim 8, wherein the stored instructions, executed by the processor, further cause the processor to:
calculate an amount of change in a movement of an object of which the category is determined to be a child or an animal, and
classify, in a case where the plurality of objects extracted by the processor include a first object of which the category is determined to be an adult by the processor and a second object of which the category is determined to be a child or an animal by the processor, and the amount of change in movement of the second object calculated by the processor is larger than a threshold value, the first object and the second object into different groups.

11. The image processing device according to claim 8, wherein the stored instructions executed by the processor further cause the processor to:
calculate a present distance between the extracted plurality of objects, and estimate a current velocity of an object of which the category is determined to be the moving object, and
classify, in a case where the plurality of objects extracted by the processor include a first object and a second object of which the categories are each determined to be a moving object by the processor, a difference of the present distance between the first object and the second object calculated by the processor and the future distance between the first object and the second object determined by the processor is smaller than a threshold value, amplitudes of the current velocities of the first object and the second object estimated by the processor are larger than 0, and a difference between the amplitudes of the current velocities of the first object and the second object estimated by the processor is smaller than another threshold value, the first object and the second object into a same group.

12. The image processing device according to claim 11, wherein the first object and the second object are objects of which the categories are each determined to be a bicycle by the processor.

13. An image processing method for a vehicle comprising:
extracting, by a processor, a plurality of objects including at least one moving object from a captured image in which the plurality of objects are photographed;
determining, by the processor, a future distance between the extracted plurality of objects;

classifying, by the processor, into groups the extracted plurality of objects based on the determined future distance, to alert a driver of different objects near a vehicle; and processing, by the processor, the captured image to generate a highlight image in which the classified plurality of objects are highlighted separately for each group.

14. A display device for a vehicle comprising:

an input interface which receives an input of a highlight image obtained by processing a captured image in which a plurality of objects including at least one moving object are photographed, the highlight image being such that the plurality of objects classified into groups based on a determined future distance between the plurality of objects are, in the highlight image, highlighted separately for each group, to alert a driver to different objects near a vehicle; and an output interface which outputs the highlight image input of which is received by the input interface.

15. The image processing method of claim 13, further comprising outputting an alert for at least one of the separately highlighted object in said each group.

16. The image processing method of claim 13, further comprising output the generated highlight image to an in-vehicle system to support a driver in safe driving.

17. A non-transitory computer readable medium storing an image processing program to cause a computer to execute operations comprising:

extracting a plurality of objects including at least one moving object from a captured image in which the plurality of objects are photographed;

determining a future distance between the extracted plurality of objects;

classifying into groups the extracted plurality of objects based on the determined future distance to alert a driver of different objects near a vehicle; and processing the captured image to generate a highlight image in which the classified plurality of objects are highlighted separately for each group.

18. An image processing method comprising:

extracting, by a processor, a plurality of objects including at least one moving object from a captured image in which the plurality of objects are photographed;

determining, by the processor, a future distance between the extracted plurality of objects;

classifying, by the processor, into groups the extracted plurality of objects based on the determined future distance;

processing, by the processor, the captured image to generate a highlight image in which the classified plurality of objects are highlighted separately for each group; and output the generated highlight image to a security system which monitors security and safety around an entity.

* * * * *